April 26, 1960   J. W. BURTON ET AL   2,934,104
SERVICE UNIT FOR AIR LUBRICATOR AND FILTER COMBINATION
Original Filed Feb. 2, 1956   3 Sheets-Sheet 1
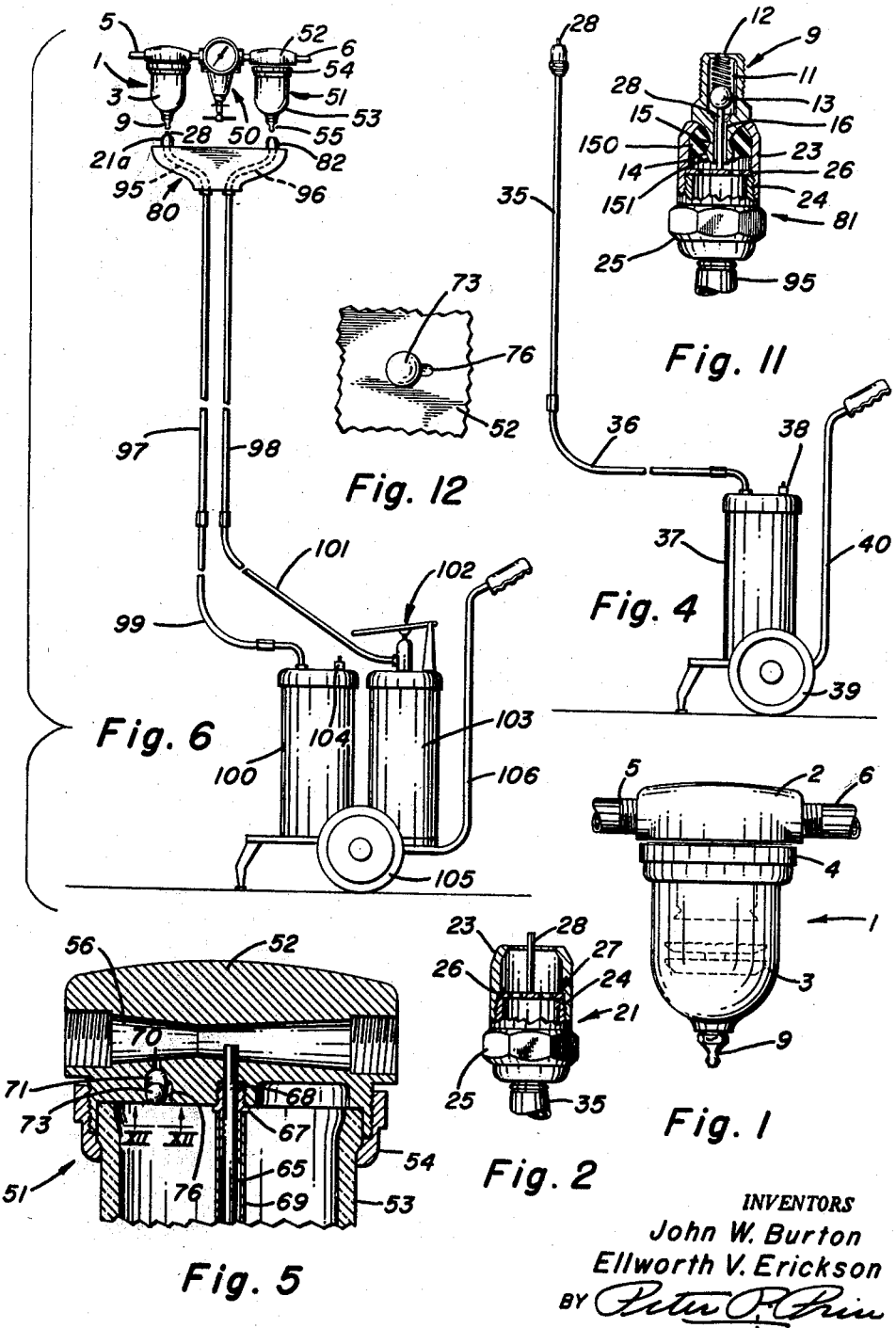
INVENTORS
John W. Burton
Ellworth V. Erickson
BY
ATTORNEY April 26, 1960   J. W. BURTON ET AL   2,934,104
SERVICE UNIT FOR AIR LUBRICATOR AND FILTER COMBINATION
Original Filed Feb. 2, 1956   3 Sheets-Sheet 2
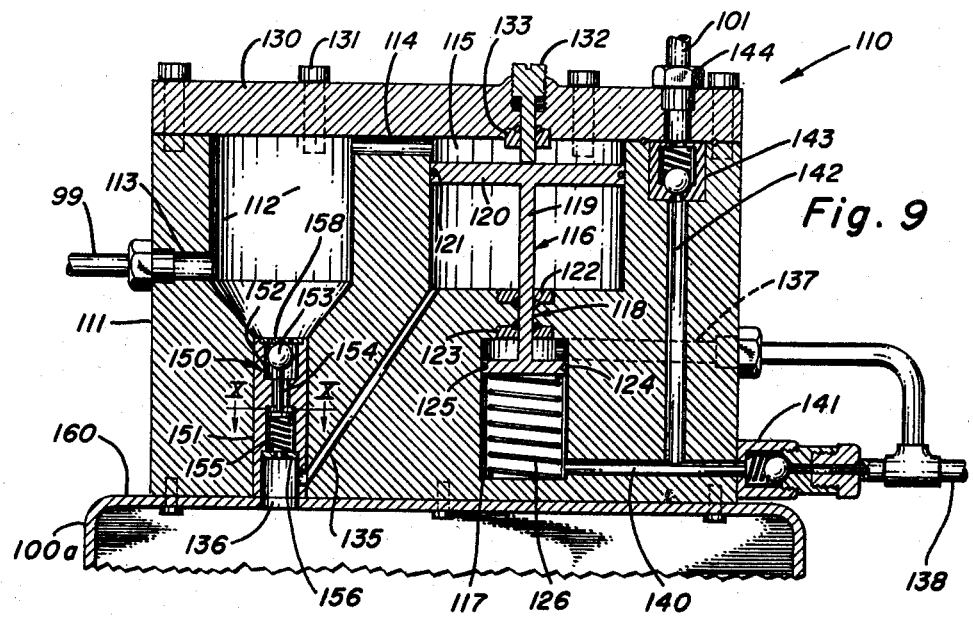
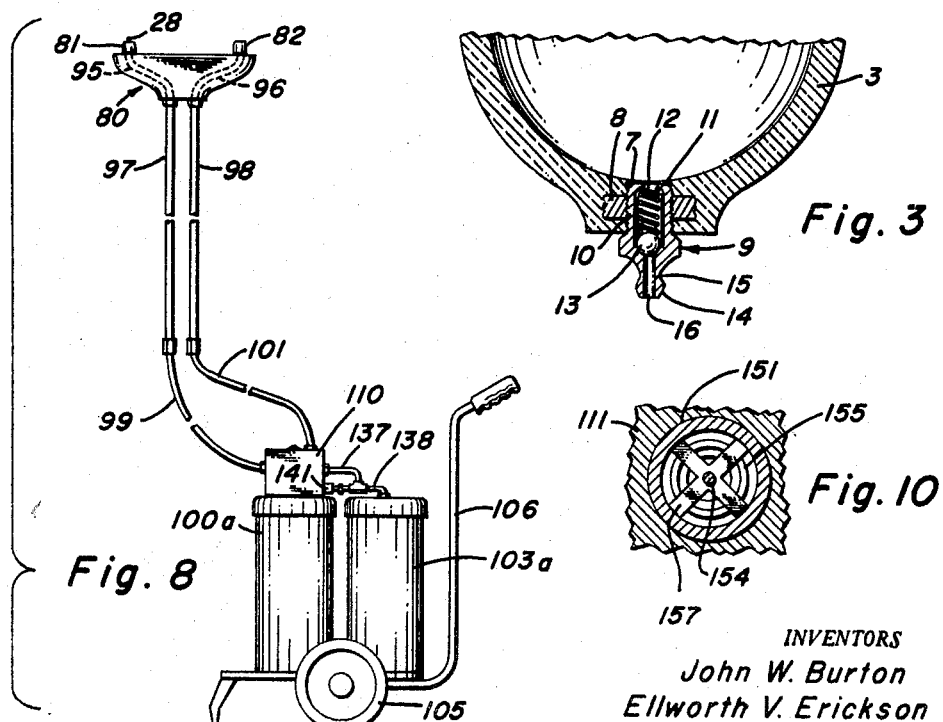
INVENTORS
John W. Burton
Ellworth V. Erickson
BY
ATTORNEY April 26, 1960     J. W. BURTON ET AL     2,934,104
SERVICE UNIT FOR AIR LUBRICATOR AND FILTER COMBINATION
Original Filed Feb. 2, 1956     3 Sheets-Sheet 3
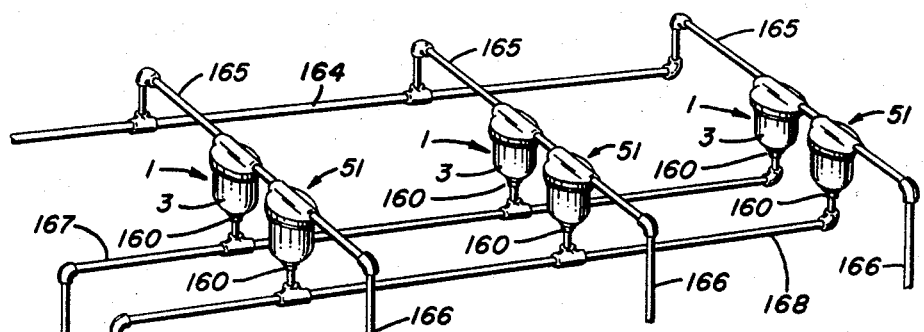
Fig. 15
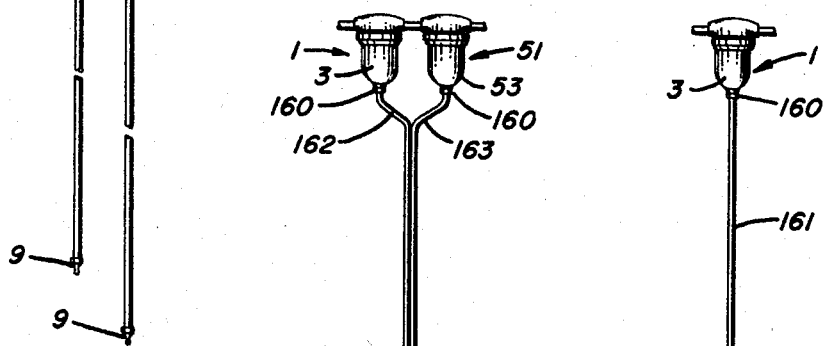
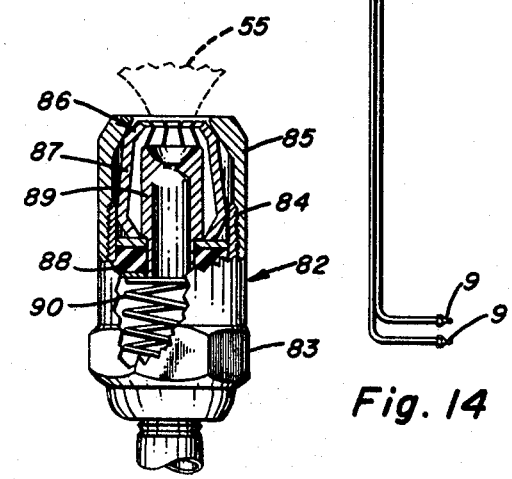
Fig. 7     Fig. 14     Fig. 13
INVENTORS
John W. Burton
Ellworth V. Erickson
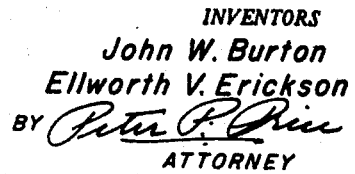
ATTORNEY

United States Patent Office 2,934,104
Patented Apr. 26, 1960

2,934,104

SERVICE UNIT FOR AIR LUBRICATOR AND FILTER COMBINATION

John W. Burton and Ellworth V. Erickson, Grand Haven, Mich., assignors to Gardner-Denver Company, Quincy, Ill., a corporation of Delaware Original application February 2, 1956, Serial No. 563,072. Divided and this application March 11, 1957, Serial No. 645,082

5 Claims. (Cl. 141—286)

This invention relates to a tool for draining water and foreign particles from the bowls of air line filters and in one phase of this invention to a tool which simultaneously both drains the filter bowl and fills the bowl of an air line lubricator with oil, all of this being done without requiring the shutting off of the flow of air to the tools serviced by the lubricator or filter.

This application is a division of our copending application Serial Number 563,072, filed February 2, 1956, entitled Service Unit for Air Lubricator and Filter Combinations, now abandoned.

Pneumatically operated tools are used extensively on modern factory production lines. These tools are driven by air under high pressure supplied through a suitable distribution system. The air, as it passes through the system to the tool, normally contains traces of dirt and water detrimental to the tool. It is, therefore, not only desirable but practically necessary to provide a filter in the line just ahead of the tool in which both the dirt and the water are removed from the air. This foreign material is collected in a bowl, which, from time to time, must be emptied. Heretofore the only method of accomplishing this was to shut off the air and drain the bowl either by removal of the bowl or by opening a special drain cock. The drain cock was then closed and the flow of air in the line was resumed.

In the large plants utilizing hundreds of filter units, it is impossible to avoid doing a major portion of this servicing operation during operating hours. The necessity for shutting off the line means interruption of the tool's operation. In highly coordinated production lines, these disruptions, cumulatively, result in appreciable production losses. This invention eliminates this by providing a tool which will effectively drain the water and dirt from the filter bowl while the line is in operation, that is, while the air within the bowl is under operating pressure, normally about 90 p.s.i.

This problem is considered so serious that many plants have equipped their filters with automatic draining devices. The devices, in response either to fluctuations in line pressure or in response to the accumulated quantity of water in the bowl, automatically discharge the water. The water and dirt is sprayed on the operating personnel and the material in production. Therefore, this is neither a satisfactory nor a practical solution to the problem.

A second aspect of the problem of draining the filter bowls arises from the fact that the air is supplied to the tools from overhead lines. Under these circumstances, the filter units are normally mounted in the line above the operators' heads. To service such filter units, the maintenance crew must be equipped with a ladder or a portable scaffold in order to gain access to them. This is a slow and laborious process. Further, the necessity of having to use ladders or scaffolds frequently requires the operator, whose tool is involved, to temporarily leave his post. This results in an even greater loss of production time which cumulatively becomes a serious matter in a highly co-ordinated production line. This invention eliminates this problem by making it possible to drain the filter units from the floor level. The necessity for the service man to climb up to the filter unit itself is eliminated.

This invention also contemplates a further improvement, that being a tool adapted to simultaneously service the filter unit and refill the lubricator associated with the filter. With this invention, both operations are carried out quickly and may be accomplished even though the lubricator and filter are so located that without this invention they would be inaccessible.

A further aspect of this invention provides a mechanism by which the air pressure released from the filter bowl as it is drained is utilized to pump the oil into the lubricator reservoir against the reservoir's normal operating pressure. This arrangement eliminates the necessity of providing special pumping equipment to force the lubricant into the lubricator's reservoir against the reservoir's normal operating pressure.

As contemplated by this invention, the bulk lubricant supply and the water collection tank are mounted on suitable equipment to render them portable. Thus, the operator may rapidly move from one filter and lubricator station to another. This arrangement permits a single operator to service in the same time many more filters and lubricators than is now possible. This results primarily from the substantial reduction in the time required for the actual servicing of each individual filter or filter-lubricator combination. The actual draining and/or filling operation requires seconds instead of minutes. Further, the service man may carry out his operations without in any way disturbing the tool operator on the production line.

The invention has the further advantage of utilizing relatively inexpensive equipment. The equipment is simple and therefore not subject to operational failure. This simplicity also makes it feasible to train a man quickly and easily to its proper use.

These and other objects and advantages of this invention will be immediately seen by those acquainted with the design and maintenance of systems utilizing gas under a high pressure in which it is desirable to filter the gas under pressure, or both filter and lubricate the gas while under pressure, upon reading the following specification and the accompanying drawings.

In the drawings:

Fig. 1 is a side elevation view of an air filter unit equipped with a discharge valve at its lower end.

Fig. 2 is an enlarged central sectional view of a coupler unit adapted to engage the discharge valve on the filter unit.

Fig. 3 is an enlarged fragmentary central sectional view of the discharge valve on the filter unit.

Fig. 4 is a fragmentary, schematic, view of a filter servicing tool having a rigid wand for servicing overhead filter units.

Fig. 5 is a fragmentary, sectional, elevation view of a lubricator unit having a check valve mounted in the air inlet for the lubricant bowl.

Fig. 6 is a schematic, fragmentary, elevation view of a tool for simultaneously servicing an air line filter and a lubricator combination.

Fig. 7 is a fragmentary, partially broken view of the coupler for the lubricator.

Fig. 8 is a fragmentary, schematic, elevation view of a modified form of the tool shown in Fig. 6.

Fig. 9 is an enlarged, central sectional view of the lubricant pumping unit shown in Fig. 8.

Fig. 10 is an enlarged, fragmentary, sectional view taken along the plane X—X of Fig. 9.

Fig. 11 is a fragmentary, partially broken view of a modified coupler for the tool shown in operative engagement with the valved fitting of the filter unit.

Fig. 12 is a fragmentary bottom view of the check valve taken along the plane XII—XII of Fig. 5.

Fig. 13 is a side elevation view of a modified arrangement for draining the filter bowl.

Fig. 14 is a side elevation view of a modified arrangement for servicing the filter bowl and lubricator simultaneously.

Fig. 15 is an isometric, schematic view of this invention arranged for servicing a multiplicity of filter and lubricator combinations.

In executing the objects and purposes of this invention, we have provided a tool designed to engage a special valve on the bottom of a filter bowl and to open the valve so that water and foreign particles collected in the filter bowl may be drained out through a pipe into a collection tank while the filter unit is under normal, operating pressure.

Referring specifically to the drawings, the numeral 1 indicates an air filter having a cap 2 and a transparent collection bowl 3 depending from the cap 2 and secured thereto by a ring 4 (Fig. 1). The bowl 3 is preferably of a shock resistant, transparent plastic material. The air enters the filter unit 1 from a suitable conduit 5 and is discharged from the filter unit through the conduit 6. The bottom of the bowl has a central opening 7 (Fig. 3). The opening 7 is surrounded by an internally threaded insert 8 embedded in the wall of the bowl 3. The insert 8 provides a means for installing the fitting 9.

The fitting 9 has an externally threaded sleeve 10 confining a valve chamber 11. The upper end of the valve chamber has an inwardly turned flange against which seats one end of the spring 12. At the other end of the chamber is a valve seat against which the ball valve 13 is biased by the spring 12. The outer end of the fitting 9 has a head 14 connected to the main body of the fitting by a neck 14. A passage 16 passes through the head and neck and communicates with the valve chamber 11. This is but exemplary of the construction of the fitting 9.

The fitting 9 is adapted to cooperate with a coupler 21 mounted on the end of a discharge tube 35 (Fig. 2). The coupler 21 includes a shell 23 open at one end to receive the fitting 9. The opposite end of the shell 23 is internally threaded and engages over the externally threaded sleeve 24 projecting from the coupler's body member 25. Seated within the shell 23 is a perforated plate 26. The plate 26 is clamped between an internal shoulder 27 in the shell and the end of the sleeve 24. The center of the plate supports a finger 28 which projects concentrically through the opening in the end of the shell 23. The finger 28 is of such size that it will enter the opening 16 in the fitting 9 without preventing the discharge of fluid and small particles through this opening. The length of the finger 28 is such that when the coupler is fully engaged with the fitting 9, the finger dislodges the ball valve 13 in the fitting to permit the discharge of the water and particles from the bowl into the coupler. The fitting 21 is attached to a discharge tube 35. The tube 35 drains the water and particles discharged from the bowl 3 and deposits them in a suitable container.

It will be recognized that various other designs may be employed for the coupler. The basic requirement of such couplers is that they positively engage the fitting and be so constructed that when engaged they open the fitting's valve sufficiently to assure rapid and complete discharge of the water and particles collected in the bowl 3. It is not essential that a tight seal be effected between the coupler and the sides of the fitting 9. The discharge from the fitting 9 will be under such pressure that it will be jetted down through the coupler into tube 35. This discharge is merely drained into a waste container. Therefore, there will be no back pressure requiring a seal.

Fig. 4 shows a typical arrangement for this invention. The coupler 21 is mounted on the end of a long, rigid tube or wand 35. The length of the wand 35 will depend upon the height to which the operator must extend the coupler in order to reach the filter unit. The rigid wand 35 makes it possible for the operator, from floor level, to engage the coupler with the fitting 9 of a filter unit mounted in an otherwise inaccessible location such as overhead on a ceiling.

At its lower end, the wand 35 is connected to a flexible hose 36 of such length that the operator has a reasonable degree of maneuverability with the wand. The hose 36 is connected to the inlet for the tank 37. The tank 37 acts as a collection unit for the water and dirt discharged from the bowl 3. The air discharged from the bowl 3 through the wand 35 escapes from the collection tank 37 through the relief opening 38. The size of the opening 38 should be such that no back pressure is generated in the tank.

It is preferable that the tank 37 be made portable to facilitate its movement about the plant. To this end, the tank may be mounted on wheels 39 and provided with a handle 40. Thus, the operator may move his equipment easily and swiftly from one filter station to another.

Fig. 6 illustrates a lubricator and filter combination such as is commonly used in the supply lines for pneumatically operated tools. The air filter 1 is connected to a pressure regulator 50 which in turn is connected to a lubricator unit 51. The air is supplied to the combination by the conduit 5 and discharges to the tool through the conduit 6. It will be recognized that while the pressure regulator 50 is illustrated as being used between the filter and lubricator, this arrangement need not necessarily be used, the filter and lubricator being mounted immediately adjacent each other. The construction of the filter unit 1 is identical to that of the filter 1 illustrated in Fig. 1 and has a fitting 9 at the bottom of the bowl 3.

The lubricator 51 is quite similar to the filter 1 in that it has a cap 52 from which is depending a bowl 53 secured to the cap by an internally threaded ring 54. The bowl 53, as illustrated, is transparent and is preferably of a shock resistant plastic material. Mounted in the bottom of the bowl 53 is a fitting 55. The fitting 55 replaces the drain cock valve sometimes provided at the bottom of the lubricator bowl. The fitting 55 can be identical to the fitting 9. Accordingly, identical numbers are used to identify corresponding parts of the fittings 9 and 55 (Figs. 3 and 11).

Lubricant stored in the bowl 53 is supplied by a wick 65 in measured quantities to the air stream passing through the air passage 56 in the cap 52 of the lubricator (Fig. 5). The upper end of the wick projects into the air passage 56. The wick 65 is held in place by a gland nut 67 which cooperates with a seal 68. That portion of the wick projecting below the gland nut 67 is surrounded by a tube 69 mounted on the lower end of the gland nut 67.

It is essential that the oil in the bowl 53 be under the same pressure as the air in the passage 56. To effect this, an opening 70 (Fig. 5) is provided through the lower portion of the cap 52 communicating with the passage 56 and with the interior of the bowl 53. The air passage includes a chamber 71 having a restriction at its lower end. Normally seated against the restriction is a ball valve 73 biased against the restriction by gravity. The upper end of the chamber 71 is shaped to provide a seat for the ball 73. A small slot 76 is provided in one side of the chamber 71 to permit air entering through the opening 70 to bypass the ball valve 73 when the ball valve is seated against the restriction. The size of passage 76 need not be great since the quantity of air which must pass through it to maintain a proper balance of pressure within the bowl 53 is quite small. The passage 76 terminates below the seat at the upper end of the chamber 71 whereby the ball when moved against this seat will effectively seal the opening 70 and prevent the discharge of air or oil from the interior of the bowl 53 into the passage 56. The purpose of this check valve will be described more fully under "Operation".

Fig. 6 illustrates a device for simultaneously servicing both the filter and the lubricator. To this end, the device has a head 80 of such width as to extend the full distance between the filter and the lubricator. It will be recognized that where the regulator valve 50 is not employed, the width of the head will be substantially less than that illustrated in Fig. 6. The head is equipped with a pair of couplers 21a and 82, designed to engage the fitting 9 on the filter and the fitting 55 on the lubricator respectively. The coupler 21a is similar to the coupler 21 except that is mounted on the head 80 rather than on the end of a hose 22. The coupler 21a has a central finger 28 for opening the valve mechanism in the fitting.

The coupler 82 is illustrated in detail in Fig. 7. The coupler 82 has a body member 83 from which is projecting an externally threaded sleeve 84. Seated over the sleeve 84 is a shell 85 the outer end of which is open and flanged inwardly to create the cam surfaces 86. Seated within the shell is an annular sealing member 87 the outer end of which is flanged inwardly. The outer end is segmented creating fingers which are biased inwardly by the cam surfaces 86 when the sealing member 87 moves outwardly.

The inner end of the sealing member seats against an axially movable seal 88 consisting of a pair of washers with a compressible gasket between them. A tubular spindle 89 is located concentrically within the sealing member 87. The inner end of the spindle 89 is of reduced diameter and passes through the seal 88. The reduction in diameter of the spindle 89 creates a shoulder which rests against the outer face of the seal 88. The seal is biased outwardly by a spring 90.

As the head of the fitting 55 enters the coupler 82 it spreads the segmented end of the sealing member 87 and seats against the cupped end of the spindle 89. At this point the head has passed beyond the segmented end of the sealing member 87 and the sealing member clamps against the neck of the fitting 55. Upon admission of lubricant under pressure to the coupling 82 the seal 88 is forced toward the fitting 55 effecting a tight seal between the head of the fitting 55 and the spindle 89. In addition, the end of the sealing member 87 is forced against the cam surfaces 86 pressing the sealing member tightly against the neck of the fitting 55 forming a second seal.

The head 80 has a pair of passageways 95 and 96. The passageway 95 connects with the coupler 81 and the passageway 96 connects with the coupler 82. The passageways 95 and 96 terminate at a pair of ports in the center of the lower face of the head 80. Each port connects with a rigid conduit, the port for the passageway 95 connecting with the conduit 97 and the port for the passageway 96 connecting with the conduit 98. The conduit 97 at its lower end connects with a flexible hose 99 which in turn is connected to a fitting from the tank 100. The rigid conduit 98 connects with a flexible hose 101 which connects with the pump 102 on the tank 103. The flexible hoses 99 and 101 are of such length that the operator has reasonable freedom to manipulate the head 80 without moving the tank 100 and 103. The rigid conduits 97 and 98 correspond to the wand 35 shown in Fig. 4, permitting the operator to raise the head 80 to engage an overhead filter and lubricator combination.

The tank 100 provides a collection chamber for water and dirt discharged from the filter unit 1. Air is discharged from the tank through the relief port 104.

The tank 103 provides a bulk supply of lubricant for filling the bowl or reservoir of the lubricator 51. The pump 102 withdraws lubricant from the tank 103 and places it under sufficient pressure that it will be forced into the bowl of the lubricator 51 against the operating pressure existing in the bowl. Thus, under normal operating conditions, the pump must be capable of raising the pressure on the lubricant above that which is necessary to overcome the normal operating pressure in the bowl 53 plus the weight of the column of lubricant in the hose 101, conduit 98 and passageway 96.

To facilitate the movement of the tanks 100 and 103 and their related mechanisms, the tanks may be mounted on a cart having wheels 105 and a suitable handle 106. Thus, the operator may move the tool from one location to another with a minimum of difficulty and delay.

Fig. 8 illustrates a modification of the tool illustrated in Fig. 6. In this arrangement, the head 80 with its couplers 81 and 82 and the rigid conduits 97 and 98 and their connecting flexible hoses 99 and 101, respectively, are utilized. However, in connection with the tanks 100a and 103a, there is provided a lubricant pumping unit 110, which replaces the pump 102 illustrated in Fig. 6.

The pumping unit 110 is illustrated in detail in Fig. 9. The pumping unit has a main housing 111. Within this housing is a separation chamber 112 into which the water, air and dirt discharged from the filter unit through the flexible hose 99 enters through the port 113. In the separation chamber 112, the dirt and water precipitate from the air and collect at the bottom of the chamber. Above the inlet port 113 is a connecting passage 114, providing communication between the collection chamber 112 and the power chamber 115 for the reciprocating piston 116. The connecting passage 114 is placed substantially above the inlet port 113 to assure the separation of the water and dirt from the air before the air passes to the power chamber 115.

The power chamber 115 is connected to the pumping chamber 117 by a small passage 118 through which passes the rod 119 of the piston assembly 116. The diameter of the power chamber 115 is substantially greater than that of the pumping chamber 117. The piston assembly 116 has a piston head 120 in the power chamber 115. The piston head is surrounded by a sealing gasket 121 to substantially prevent the leakage of air past the head. Where the rod 119 passes from the power chamber 115 into the passage 118, the rod is surrounded by a sealing gland 122 to prevent air leakage into the passage 118. Another sealing gland 123 is provided around the rod 119 where it enters the pumping chamber 117. The sealing gland 123 prevents the escape of lubricant from the pumping chamber 117 into the passage 118.

Within the pumping chamber 117, the piston assembly 116 has a head 124 surrounded by a sealing gasket 125. Seated within the pumping chamber 117 is a compression spring 126 of such strength that it biases the piston assembly 116 upwardly into the power chamber 115. The strength of the spring 126 must also be sufficient to raise lubricant from the tank 103a to fill the pumping chamber 117 as the piston is returned into the power chamber 115.

The top of the housing 111 is closed by a plate 130 secured by bolts 131. Extending through the plate 130 into the center of the power chamber 115, an adjustment stud 132. The adjustment stud 132 is externally threaded for axial adjustment in the plate 130. On the inside of the plate, the stud 132 passes through a packing gland 133 to prevent the escape of air about the stud. The axial position of the adjustment stud 132 determines the stroke length of the piston assembly 16 and thus the quantity of lubricant pumped by the unit during each operating cycle.

Any air working its way behind the piston head 120 is discharged through the bleed passage 135 which connects with the passage 136 at the lower end of the separation chamber 112. This prevents resistance to the movement of the piston as it is depressed. It also prevents a partial vacuum resisting the retraction of the piston as it moves upwardly.

In a similar fashion, the upper end of the pumping chamber 117 is vented by a passageway 137 connecting with the conduit 138 through which lubricant is withdrawn from the tank 103a to the pumping mechanism 110. Thus, oil will not be trapped behind the piston 124 to interfere with its operation.

Lubricant is supplied to the pumping chamber 117 through the supply passage 140 opening through the side of the housing 111 and connecting with the conduit 138. Between the conduit 138 and the supply passage 140 is a check valve 141 designed to prevent the return of lubricant from the pumping chamber 117 to the tank 103a.

A delivery passage 142 connects with the supply passage 140 between the pumping chamber 117 and the check valve 141. The delivery passage 142 has a check valve 143 press-fitted in its end immediately beneath the plate 130. The delivery passage 142 passes through the plate 130 where it is internally threaded to receive a nipple 144 to which the flexible hose 101 is connected. The check valve 143 prevents the return of lubricant from the flexible hose 101 into the pumping chamber 117.

Mounted in the passageway 136, at the bottom of the separation chamber 112, is a valve unit 150. The valve unit 150 includes a shell 151, the upper end of which has a valve seat 152. A valve ball 153 is adapted to engage the valve seat 152.

The valve ball 153 is engaged from below by a pin 154 biased upwardly toward the ball by a spring 155. The lower end of the spring bears against a ring 156 press-fitted into the interior passageway of the shell 151. The pin 154, at its lower end, has a spider 157 (Fig. 10) providing a bearing surface for the spring 155 maintains the valve in open position, that is, with the valve ball 153 raised from the valve seat 152 and against the perforated ball retainer 158.

The strength of the spring 155 is such that it will maintain the valve 150 in open position under the weight of water collected in the separation chamber 112 even though the chamber is practically full. However, as soon as the separation chamber 112 is charged with the operating pressure from the air lines supplying the filter unit, the spring 155 will be overcome and the valve unit 150 will close. It will be noted that the bleed passage 135 connects to the passage 136 through a side opening in the shell 150, below the valve unit. This is necessary since the bleed passage 135 must discharge to atmospheric pressure. The passageway 136 communicates through the top 160 of the tank 100a whereby water and dirt particles collected in the separation chamber 112 ultimately are discharged into the collection tank.

When the pumping unit 110 is utilized the couplers 21 and 21a cannot be employed since it is necessary to provide a pressure seal between the fitting 9 and the coupler at the filter unit. The coupler 81 which replaces the coupler 21 in this case is illustrated in Fig. 11. The coupler 81 is identical to the coupler 21 except for the addition of the flexible seal 150. The flexible seal may be fabricated from any suitable material such as a synthetic rubber, an example of which is "neoprene," made by E. I. du Pont Co.

The flexible seal is securely mounted in the open end of the shell 23 and has a central passage shaped to fit closely about the fitting 9. At its lower end the seal has a thin ring-like flange 151 which is slightly stretched by the insertion of the fitting 9. When the water and/or waste material and air under pressure fills the coupler, it forces the flange 151 tightly against the fitting 9 creating a pressure tight seal.

Fig. 13 illustrates an arrangement for servicing the filter bowl when it is in an inaccessible location and inconvenient to attempt to reach it by a wand 35 such as is illustrated in Fig. 4. In this case, the filter 1 having a bowl 3 has at its lower end a nipple 160 substituted for the fitting 9. The nipple 160 provides a means for attaching to the bottom of the filter bowl 3 a conduit 161 which may either be rigid or flexible. The conduit is of such length and shape that at its lower end it terminates at a readily accessible location where service personnel may reach it with ease. Thus, it may simply hang from the filter bowl or it may be caused to follow a post or a wall down to a suitable location. At its lower end, the conduit 161 is equipped with a fitting 9 whereby the conduit and the bowl may be drained by the same equipment as that used where the fitting is mounted directly to the bowl 3.

Fig. 14 illustrates an arrangement in which both the bowl 3 of the filter 1 and the bowl 53 of the lubricator 51 may be serviced simultaneously at a point remote from the filter lubricator combination. In the case of both bowls 3 and 53, the fittings 9 are replaced by nipples 160. The nipple 160 on the bowl 3 provides a means for connecting the conduit 162 and the nipple 160 on the bowl 53, providing a means for connecting the conduit 163. The two conduits are then extended down to a suitable accessible station where each is provided with a fitting 9. As in the case of the conduit 161 illustrated in Fig. 13, the conduits 162 and 163 may be either flexible or rigid and may either hang directly down from the units or may be stapled to a post or wall.

Fig. 15 shows this invention applied to service multiple combination filter and lubricating units. Air under suitable pressure is supplied by means of the conduit 164. This air is distributed to each individual filter lubricator combination by a branch line 165. The air discharged from each of the filter lubricator combinations is carried to a suitable tool or machine by the conduits 166. Each of the filter units 1 has at the bottom of its bowl 3 a nipple 160. By this means, the common drainage line 167 is connected to each of the units. The common drainage line 167 is extended down to an accessible position in the same manner as the conduit 161 in Fig. 13. At a suitable position, the drainage line 167 terminates in a fitting 9. In like manner, nipples 160 are substituted for the fittings 9 of each of the lubricator bowls. The supply conduit 168 parallels the conduit 167 and terminates at the same station in a fitting 9. This provides a suitable means whereby a number of filter lubricator combinations may be simultaneously serviced from a single, remote station which may be located in any convenient and accessible position. The size of the dirt particles which collect in the filter bowls 3 is such that they will not clog the drain line 167. Further, since the drain line 167 is always discharged under high pressure, any tendency for the particles to clog the line will be eliminated since they will be forcibly jetted through the fitting 9 when the unit is serviced.

It will be recognized that where the filter units alone are employed, the system illustrated in Fig. 15 may be employed, the only difference being the elimination of the lubricant supply line 168.

Operation

In the form of the invention illustrated in Figs. 1 and 2, the operation of the invention is as follows. The fitting 9 is designed to prevent the escape of air or water from the bowl 3 even though the water collected in the bowl is under a normal operating line pressure, such as, for illustration 90 p.s.i. or more. Over a period of days, water entrapped in the air as it passes through the inseparated filter from the air and collects at the bottom of the bowl. The amount of water collected can be easily ascertained by the maintenance personnel since the bowl is frequently transparent. Also, particles caught by the filter unit drop into the water and settle to the bottom of the bowl 3.

When the bowl is to be drained, the operator moves his collection tank to a suitable location. Then, by means of a flexible hose connected to the tank having a coupler 21 on one end, he presses the coupler onto the fitting 9. The finger 28 enters the fitting and opens the valve mechanism. As soon as the fittings valve mechanism is opened, the pressure in the filter bowl forces the water and the dirt out of the bowl through the coupler 21 and into the hose to the operator's collection container. Under a normal operating pressure, the discharge of the water and foreign matter from the bowl 3 is practically instantaneous. As soon as the water and matter have been drained, the operator gives the coupler 21 a slight pull disengaging it from the fitting 9. Upon disengagement of the coupler the valve in the fitting 9 automatically closes. This completes the servicing of the filter bowl. It will be noted that in this operation not only was it unnecessary to shut off the flow of air in the conduit 5 supplying the filter, but the pressure existing in the bowl 3 was utilized to assure quick and complete ejection of all the water and dirt.

The arrangement of the tool illustrated in Fig. 4, adapts the tool to the serving of filter units located in an overhead position where they would be inaccessible from floor level except with a tool capable of reaching the unit. The rigid wand 35 accomplishes this purpose. With this wand, the operator may elevate the coupler 21 and guide it into engagement with the fitting 9 on the filter unit. Since the wand is rigid, the operator may manipulate the coupler freely to engage the fitting 9. It will be understood that this operation could be facilitated by the addition, to the end of the wand, of a position unit which will index the coupler 21 with the fitting 9 prior to engagement.

Using the wand 35, the operator may rapidly and easily service a large number of filter units. The necessity for ladders or scaffolds is entirely eliminated, it being only necessary that the operator transport the collection or disposal container 37 as he moves through the plant. The equipment is of such simplicity, compactness and ready portability that the operator may move through the plant aisles with ease and without interfering with other workers in the same area. With this equipment, all danger of water and dirt or trace of lubricant being sprayed upon workers or materials is eliminated. All of the water and dirt is confined entirely within the tool at the time of discharge.

The use of blow-out valves in the bottoms of the filters is eliminated. Thus, the problems created by the discharge from these blow-out valves above the workers and materials is eliminated. Since the water and dirt are ejected under high operating pressures, the filter bowl is more effectively cleaned and drained of its collected waste materials than it is under present systems since the waste materials are discharged forcibly from the bowl.

When the system illustrated in Fig. 6 is utilized, the service operator is able to simultaneously drain the filter bowl and recharge the reservoir bowl of the lubricator. Again, this may be accomplished from floor level without the use of ladders or scaffolding. To service a combined filter and lubricator unit, the operator merely engages the couplers 21a and 82 on the filter and lubricator respectively by moving the head 80 into the proper position. When fully engaged, the filter bowl will drain automatically. At the same time the pump 102 is manipulated to force oil into the lubricator bowl 53. Both operations can be executed rapidly and without disturbing any of the personnel or materials in the immediate vicinity of the operation. It will be seen that an operator using this equipment can service a large number of filter-lubricator combination units in a short period of time. Further, the entire operation is confined within the equipment eliminating any discharge of water or lubricant upon the personnel or equipment in the immediate vicinity.

The machine illustrated in Figs. 8 and 9 provides a system by which the pressure released from the filter bowl is utilized to pump the lubricant into the lubricator reservoir. This eliminates the necessity for a hand or power operated pump on the lubricant supply. This has the advantage of relieving the operator from placing the lubricant under pressure by hand or the necessity for providing a source of power to drive a separate pump such as would be necessary if a pneumatically or electrically energized pump were utilized.

The pumping unit 110, as illustrated in Fig. 9 is in the condition it would be when the head 80 is disconnected from the lubricator and filtering units. The separation chamber 112 is at atmospheric pressure. Thus, the spring 126 has expanded, forcing the piston assembly 116 up into the power chamber 115. As the piston rises lubricant is drawn through the line 138 past the check valve 141 into the pumping chamber 117. During the operation, the check valve 143 will remain closed since the pressure on it will be negative.

The operator then raises the head 80 to simultaneously engage the couplers 81 and 82. As soon as the finger 28 of the coupler 81 opens the valve in the fitting 9 the line pressure existing in the bowl 3 of the filter unit 1 will be discharged along with the water and dirt into the separation chamber 112. The rapid increase in pressure in the chamber 112 will close the check valve 150 and force the piston assembly 116 downwardly against the spring 126. The lubricant trapped in the pumping chamber 117 by the closure of the check valve 141 will be discharged through the check valve 143 to the lubricator unit 51. When the piston assembly 116 reaches its maximum downward stroke, the operation of draining the filter and charging the lubricator is completed.

The piston assembly 116 will remain depressed until the operator disconnects the head 80 from the filter lubricator assembly. This will immediately release the pressure in the separation chamber 112. The spring 126 will then assert itself, biasing the piston assembly 116 upwardly drawing a new charge of lubricant from the container 103a. At the same time, the spring 155 will be relieved and will bias the ball valve 153 upwardly, permitting the water and dirt to drain through the opening 136 into the container 100a.

By manipulation of the adjustment stud 132, the degree of travel of the piston assembly 116 may be accurately regulated. This will determine the quantity of oil which will be discharged into the lubricator during each operation of the pumping unit 110. For the average lubricator, a charge of approximately 2½ ounces will be sufficient. However, other lubricators may require different quantities. The adjustment stud makes the machine adaptable to these situations.

The differential in diameters between the piston heads 120 and 124 provides the mechanical advantage whereby the operating line pressure entering the separation chamber 112 from the filter unit is capable of forcing lubricant against this same pressure into the lubricator reservoir 53. The increase in pressure imposed upon the lubricant, as it is ejected from the pumping chamber 117, will be determined by the degree of differential between these pistons.

The pumping unit 110 provides a self-contained unit eliminating the necessity for the operator pumping the lubricant to the lubricator reservoir. It also eliminates the necessity of providing the unit with an outside power source. It will be understood that the precise structure of the pumping unit 110 is illustrative only since the details of the unit may vary widely. The important feature is that a size differential be provided between the operating and pumping pistons to obtain mechanical advantage.

Where the quantity of lubricant pumped into the lubricator is not metered, as may be the case with the hand pump 102 illustrated in Fig. 6, it is desirable to provide means to prevent the lubricant in the bowl 53 from being discharged into the air passage 56 of the lubricator, should the operator accidentally overcharge the lubricator bowl.

Fig. 5 illustrates one way of accomplishing this. The check valve 73 provided in the bleed passage 70 between the air passage 56 and the lubricator bowl 3 will remain open so long as normal operations exist. However, should the lubricant be forced into the bowl at a high pressure or in a volume greater than that which will pass through the passage 76, the rapid pressure increase in the bowl 53 will force the check valve closed. This will seal the lubricant reservoir from the air passage 56. Since the air passage 76 is quite small, the rate of lubricant injection into the bowl will far exceed that which may pass through the air passage, assuring operation of the check valve.

Without the check valve, oil would be jetted in a stream in the air passage 56 resulting in a flood of oil at the tool. This is not only wasteful of lubricant and unpleasant for the tool operator but it may also be quite detrimental to adjacent materials.

It will be recognized that although reservoir bowls such as the bowl 53 are designed to withstand high pressures, for example as high as 500 p.s.i., care should be taken that the pressure under which the lubricant is injected into the bowl is substantially below this limit. This eliminates the possibility of overloading the bowl and causing it to burst. This may be done in a number of different ways such as by providing a pumping unit having a maximum capacity far below that of the rated strength of the bowl. It may be accomplished by use of a bypass around the pumping unit containing a pressure relief valve set at a value substantially below the pressure rating of the bowl.

In some situations it is necessary to locate the filter or the filter-lubricator combination, either directly above an operator or behind a large piece of equipment where it is neither readily accessible nor convenient to service by coupling directly to a fitting at the bottom of the unit even with a rigid extension such as the wand 35. Under these circumstances it is desirable to provide a conduit extending from the filter to an accessible station where it may be readily serviced. This is illustrated in Fig. 13. As the water and dirt is accumulated by the filter, it will fill the conduit 161. Since the bowl is under substantial operating pressure, the water and matter will be discharged forcibly from the line. Even though it is necessary to make a depression in the line of a nature that would normally create a moisture trap, the force of the discharge will normally clear the trap. Even though all of the water is not discharged from a line having such a trap, the unit will operate satisfactorily since the conduit itself increases appreciably the liquid holding capacity of the filter unit.

This may be combined with a lubricator as is illustrated in Fig. 14. In this case, the operator may service the filter by draining it at a remote and accessible point by coupling with the fitting 9 on the end of the conduit 162. At the same time, he may fill the lubricator by coupling to the fitting 9 on the conduit 163. Where the lubricant pump 110 is employed, the operator will couple to both fittings 9 simultaneously or he will first couple to the fitting on the end of the lubricant line 163 and then to the fitting on the end of the drainage line 162.

Whether the fittings 9 are located at the lubricators and filters or whether they are located at a remote point, except in very special circumstances, will not effect the operation of this invention. It will be understood that the fittings 9 for both units may be placed closely adjacent each other. In this case the head 80 will be redesigned to accommodate the difference in spacing. This is merely a matter of degree.

The same is true in connection with the multiple unit servicing system shown in Fig. 15. The pressure existing in each filter bowl 3 will force the liquid from the bowls into the common discharge conduit 167 whereby all of the bowls are discharged simultaneously through a single service station at the end of the conduit 167. In like manner, each of the lubricator units 51 may be charged in a single operation from a single service point at the fitting 9 on the end of the supply conduit 168. Where the lubricant pumping system does not have a metering arrangement, it is desirable, in this situation to provide a check valve in the lubricator cap of the type illustrated in Fig. 5. Should one or more of the lubricators be overcharged, the lubricant will be prevented from entering the air stream to the tools.

Should the pumping unit 110 be used with this arrangement, with the pump adapted to deliver only sufficient lubricant to fill one bowl on each operation, it will be necessary to operate the pumping unit 110 through as many cycles as there are lubricator bowls attached to the common supply line. This may be done either by intermittently coupling and uncoupling the hose 99 (Fig. 8) from the filter drainage line. Also it may be accomplished by providing a valve in the line adjacent the pumping unit 110, permitting the operator to activate and de-activate the pump as many times as there are lubricator units to be filled.

It will be seen that this invention has many advantages in addition to the economies attendant the reduction in the number of personnel required to service the filter units and the elimination of disruption of the production line resulting from interruption of the air supply to the tools. This invention reduces the working hazards of the plant since it eliminates the necessity for the maintenance personnel climbing ladders and transporting ladder equipment through the aisles of the plant. It eliminates the necessity for maintenance personnel working above the heads of the production personnel where there is always the potential of injury due to the careless removal of the filler plug from the lubricator or a drainage valve from one of the filter units before turning off the air. The danger of water or lubricant being sprayed on operating personnel or material is eliminated.

As is well illustrated in Figs. 13 and 14, the importance of the invention is not limited to filters or filter-lubricator combinations which are inaccessible because of height. Many of these units are located on large, stationary equipment and by reason of the construction of the equipment must be mounted in relatively inaccessible places such as on the side or back of the machine. In many instances this results in a considerable loss of time by the service personnel because of the difficulty of reaching the equipment to service it. In this case, the invention permits the filter or the filter-lubricator combination to be adequately serviced from a remote station. Further, this can be done without disrupting the operation of the machine or disturbing the machine's operator.

Where conduits, such as the conduits 161, 162, 163, 167 or 168 are utilized, they may be so shaped and formed that they terminate at the most convenient location, thus adapting the equipment to the most efficient servicing arrangement. It is to be understood from these statements that this invention is not limited to the servicing of filters or filter-lubricator combinations for small, portable, pneumatic tools since, in its broader aspects, it may be applied to any filter having a collection chamber or a filter-lubricator combination having both collection chamber and lubricant reservoirs where the units are under elevated operating pressures. It is also to be understood that this invention is not limited in its application to any specific pressure valve or range of values.

This invention has another advantage. Since all stations at which the lubricators are serviced are readily accessible and can be clearly identified, there is substantially less chance that the service operator will overlook any of them. This reduces machine and tool replacement and repair costs. In large plants this factor alone amounts to an appreciable saving.

This invention is designed to be applied to pressurized lubricating and filtering systems since it permits them to be serviced under operating pressure. The inability of present equipment to accomplish this purpose has been a source of both expense and difficulty to the users of this equipment for many years. It will be recognized that other advantages of this system will be discovered as it is applied. It will also be recognized that the cited applications are only a portion of the potential applications to which this invention may be put and it is not to be considered that the invention is limited to the particular types of tools for which the air is treated by the filters and lubricators. Accordingly, various modifications of this invention, which embrace the principles herein described, are to be considered as included in the hereinafter appended claims unless these claims by their language expressly state otherwise.

We claim:

1. Apparatus for simultaneously servicing a lubricator and filter connected in an air line while said air line is under elevated pressure, said lubrictor and filter each communicating with a valved port formed by valved fittings spaced from the other, the combination comprising: a source of lubricant; a waste container; first and second conduits communicating at one of their ends respectively with said source and said container; a rigid head on the other end of said conduits; said head having two ports, one communicating with each of said conduits; said ports being spaced the same distance as said fittings; means in one of said ports engaging the fitting on said filter adapted to open the valve in said fitting on said filter permitting waste material to discharge from said filter into said container; said other port engaging the other of said fittings and effecting a pressure tight seal therewith permitting said lubricant to be injected into said lubricator from said source; and means characterized by mechanical advantage for transmitting the energy present in the air accompanying the waste material discharged from said filter to pressure imposed upon the lubricant for injecting said lubricant into said lubricator.

2. Apparatus for simultaneously servicing a lubricator and filter connected in an air line while said air line is under elevated pressure, said lubricator and filter each communicating with a valved port formed by valved fittings spaced one from the other, the combination comprising: a source of lubricant; a waste container; first and second conduits communicating at one of their ends respectively with said source and said container; a rigid head on the other end of said conduits; said head having two ports, one communicating with each of said conduits; said ports benig spaced the same distance as said fittings; means in one of said ports engaging the fitting on said filter and adapted to open the valve in said fitting permitting waste material to discharge from said filter into said container; said other port engaging the other of said fittings and effecting a pressure tight seal therewith permitting said lubricant to be injected into said lubricator from said source; conduit means extending between said first and second conduits and having a piston intermediate its ends whereby air under pressure operates on one side and the lubricant the other; said piston on the side operated upon by said air under pressure having a face of greater area than the area of the face on the lubricator side whereby the force exerted on said piston when the waste material is discharging is transmitted to the lubricant being injected in said lubricator.

3. Apparatus for simultaneously servicing a lubricator and filter connected in an air line while said air line is under elevated pressure, said lubricator and filter each communicating with a valved port formed by valved fittings spaced from the other, the combination comprising: a source of lubricant; a waste container; first and second conduits communicating at one of their ends respectively with said source and said container; a coupler on the end of each of said conduits; said coupler on said first conduit engaging with said fitting on said lubricator and permitting lubricant to be injected into said lubricator from said source; said coupler on said second conduit engaging said fitting on said filter; means in the coupler on said second conduit adapted to open the valve in said fitting on said filter permitting waste material to discharge from said filter into said container; and means characterized by mechanical advantage for translating the energy of the air accompanying the waste material discharged from said filter to pressure imposed upon the lubricant effecting injection of said lubricant into said lubricator.

4. Apparatus for simultaneously servicing a lubricator and filter connected in an air line while said air line is under elevated pressure, said lubricator and filter each communicating with a valved port formed by valved fittings spaced from each other, the combination comprising: a source of lubricant; a waste container; first and second conduits communicating at one of their ends respectively with said source and said container; a coupler on the end of each of said conduits; said coupler on said first conduit engaging with said fitting on said lubricator, forming a pressure tight seal therewith and permitting lubricant to be injected into said lubricator from said source; said coupler on said second conduit engaging said fitting on said filter and forming a pressure tight seal therewith; means in the coupler on said second conduit adapted to open the valve in said fitting on said filter permitting waste material to discharge from said filter into said container; and means characterized by mechanical advantage for translating the energy of the air accompanying the waste material discharged from said filter to pressure imposed upon the lubricant effecting injection of said lubricant into said lubricator.

5. In apparatus for simultaneously servicing a lubricator and filter connected in an air line while said air line is under elevated pressure, said lubricator and filter each having a valved port therein; a first conduit having a pressure tight connection with one of said valved ports, a second conduit having a pressure tight connection with the other of said valved ports, the one of said conduits connected with the valved ports of said filter having means for opening said port; conduit means extending between said first and second conduits and having a piston intermediate its ends whereby air under pressure operates on one side and the lubricant the other; said piston on the waste side having a face of greater area than the area of the face on the lubricator side whereby the force exerted on said piston when the waste material is discharging is transmitted to the lubricant being injected into said lubricator.

References Cited in the file of this patent

UNITED STATES PATENTS

| | | |
|---|---|---|
| 1,450,561 | Parker | Apr. 3, 1923 |
| 1,659,047 | Quinn | Feb. 14, 1928 |
| 1,818,123 | Engebrecht | Aug. 11, 1931 |
| 2,100,092 | Tear | Nov. 23, 1937 |
| 2,508,015 | Dexter | May 16, 1950 |